United States Patent [19]
Chaffee

[11] Patent Number: 5,099,491
[45] Date of Patent: Mar. 24, 1992

[54] LASER GAS REPLENISHMENT SYSTEM

[75] Inventor: Edwin G. Chaffee, Salt Lake City, Utah

[73] Assignee: American Laser Corporation, Salt Lake City, Utah

[21] Appl. No.: 618,065

[22] Filed: Nov. 26, 1990

[51] Int. Cl.⁵ .............................................. H01S 3/036
[52] U.S. Cl. .................................... 372/59; 372/58; 372/33
[58] Field of Search ................ 372/58, 59, 33, 61

[56] References Cited

U.S. PATENT DOCUMENTS

| | | | |
|---|---|---|---|
| 4,417,340 | 11/1983 | Horiuchi et al. | 372/59 |
| 4,683,575 | 7/1987 | Carlson et al. | 372/59 |
| 4,689,796 | 8/1987 | Wright | 372/59 |
| 4,815,100 | 3/1989 | Carlson et al. | 372/61 |

*Primary Examiner*—William L. Sikes
*Assistant Examiner*—Susan S. Morse
*Attorney, Agent, or Firm*—Olive & Olive

[57] ABSTRACT

A gas replenishment system for a gas laser utilizes a gas metering device between a gas reservoir and the gas laser tube which operates at a pressure below the gas reservoir pressure. The metering device incorporates a body of gas entrapping material. The tube pressure is detected and when low an electrically controlled valve is energized for a predetermined time which allows gas to flow from the reservoir, into the gas entrapping material and from there to the tube. If the tube pressure is not restored to its proper level, the system recycles for another equivalent period of time.

8 Claims, 2 Drawing Sheets

LASER GAS REPLENISHMENT SYSTEM

BACKGROUND OF THE INVENTION

1. Field of the Invention

This invention relates to gas lasers and to systems for maintaining the required volume of gas in a gas laser tube.

2. Background Art

U.S. Pat. No. 4,683,575 illustrates a gas fill system for a gas laser in which a gas metering chamber is opened and closed by a pair of solenoids. U.S. Pat. No. 4,815,100 illustrates a gas fill system in which a single solenoid opens and closes the metering chamber. The fill systems of both of the mentioned patents direct the gas directly from the reservoir to the metering chamber and then to the gas filled laser tube. U.S. Pat. No. 4,689,796 describes another system in which a gas entrapping material has its temperature controlled to control transfer of gas from the entrapping material to the gas filled laser tube according to the tube pressure which is monitored by monitoring the tube voltage.

SUMMARY OF INVENTION

The present invention seeks to provide a still further improved gas fill system for a gas laser such as an argon gas laser in which a gas entrapping material is used as a metering mechanism and which is effectively emptied and filled by use of a difference in pressure rather than by use of heat and for a time period selected to permit a predetermined volume of gas to leave the gas entrapping material and enter the gas laser tube.

The invention is described in reference to two embodiments both of which use the gas entrapping material for limiting the rate of flow and metering the gas. In one embodiment, a body of the gas entrapping material is mounted between a pair of solenoid controlled valves. In the other embodiment, a larger body of the gas entrapping material is illustrated as being associated with a single solenoid controlled valve. In both embodiments, the solenoid action is controlled by monitoring the tube voltage. A timer responds to the tube voltage when compared and found below some predetermined level and actuates either the pair of solenoids in the first embodiment or the single solenoid in the second embodiment. In both embodiments, pressurized gas from a pressurized gas reservoir held at a pressure substantially higher than the tube pressure is permitted to fill the gas entrapping material for a selected period of time when the respective solenoid valves are opened. This period of time will vary with the character of the laser as well as with size and material of the gas entrapping body. The entrapped gas is emptied from the gas entrapping material into the laser tube during the time the solenoids are open to restore the gas to the appropriate pressure and volume. The cycle is repeated upon an indication by the measured tube voltage that an additional quantity of gas is needed in the laser tube.

DETAILED DESCRIPTION OF INVENTION

Figure 1:
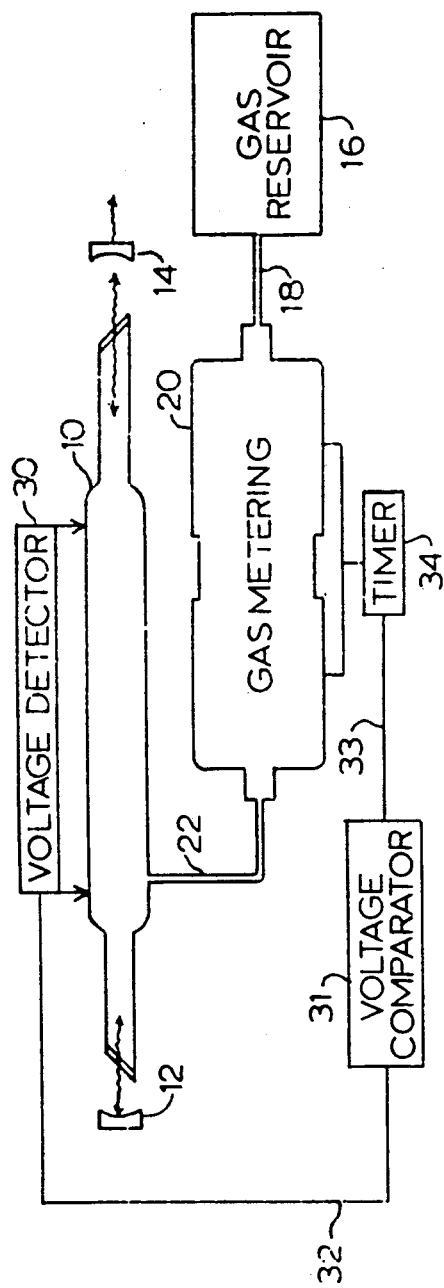
FIG. 1 is a schematic drawing of a gas replenishment system for a gas laser according to a first embodiment of the invention.

Making reference initially to FIG. 1, there is illustrated a schematic diagram of a gas replenishing system for a gas laser according to a first embodiment of the invention. In FIG. 1, there is illustrated a representative hermetically sealed gas laser tube 10 located between a pair of representative mirrors 12, 14. When a new supply of gas is required to be admitted to the laser tube 10, such gas is provided from a gas reservoir 16, normally at an elevated pressure, through an intake line 18, through a gas metering device 20 and from gas metering device 20 through a discharge line 22 to the gas laser tube 10.

The tube pressure can be measured by measuring the tube voltage. A voltage detector 30 constantly measures the voltage across the laser tube 10, and indirectly the pressure, and transmits a first signal through line 32 representative of the tube voltage to a voltage comparator 31. The voltage comparator 31 compares the actual tube voltage against a normal voltage and in the event of less than normal voltage, develops a second signal on line 33 to activate timer 34. When the signal transmitted through line 33 indicates a sufficiently low pressure and thus a need to supply gas to the laser tube 10, timer 34 develops a third signal which activates the gas metering device 20 enabling an appropriate volume of gas to be transferred from the gas reservoir 16 through the gas metering device 20 to the laser tube 10. The pressure in gas reservoir 16 will at all times be substantially in excess of the pressure in tube 10. The reservoir pressure might, for example, be 1000 Tors whereas the tube pressure could, for example, be 1 Tor. The description next refers to the gas metering device 20 in more detail.

Figure 2:
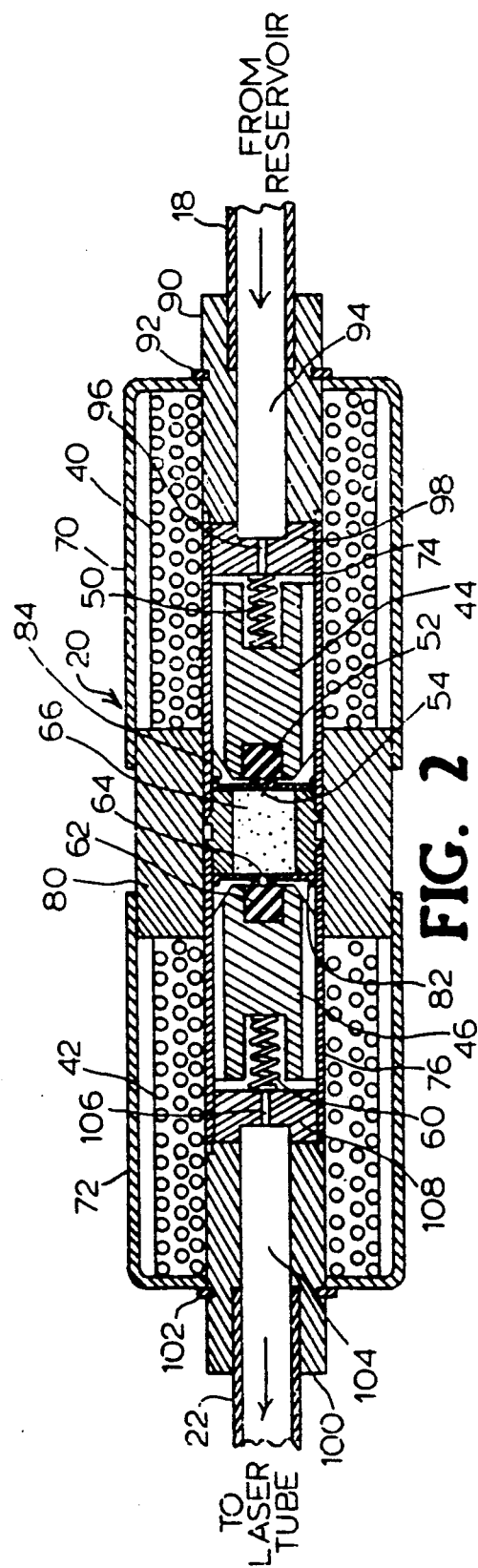
FIG. 2 is a sectional and enlarged view of a gas metering utilizing a pair of solenoids according to the first embodiment of the invention.

Making reference to FIG. 2, the gas metering device 20 includes a pair of solenoids having respective coil windings 40, 42 which when energized operate the respective armatures 44, 46. A spring 50 loads armature 44 and when solenoid 40 is de-energized enables valve closure block 52 to close the port 54. In a similar manner, spring 60 causes the valve closure block 62 on armature 46 to close the port 64. Blocks 52, 62 are formed of a suitable resilient material and which is inert to the gas being transferred so as to provide effective seals over the ports 54, 64 when the solenoids 40, 42 are deenergized. A cylinder 66 of gas retaining material is mounted between the ports 54 and 64 and may be formed, for example, of a sintered, stainless steel material of a porous nature suited to entrapping the laser gas and with a leak rate of, for example, one cubic centimeter per minute. Thus, when port 54 is open, gas can be admitted into the gas entrapping material 66 and when port 64 is open, can be transferred to passage 100.

It will further be noted that the pair of solenoids 40, 42 are contained within respective external housings 70, 72 and that the respective armatures 44, 46 are mounted within respective internal housings 74, 76. A cylindrical sleeve 80 surrounds and joins the respective housings 74, 76. Housings 74, 76 surround the respective walls 82, 84 which form the respective ports 54, 64 and between which is mounted the gas retaining cylinder 66. Incoming line 18 connects to a cylindrical mounting block 90 retained by a C-ring 92 and which forms a passage 94 which connects to a port 96 formed in the spring support block 98. In a similar manner the discharge line 22 is mounted in a cylindrical block 100 held by a C-ring 102 and in which is formed a passage 104 connected to a port 106 formed in spring retaining block 108. The size of gas retaining cylinder 66 will vary according to the material of which cylinder 66 is formed, the pressure difference between reservoir 16 and tube 10, the time cycle and like considerations. In one example such as in FIG. 2, cylinder 66 was 3/16" long and had an outside diameter of 3/16".

In operation, the voltage detector 30 detects the tube voltage which is representative of the tube pressure. When timer 34 is energized solenoids 40 and 42 are also energized for a predetermined time during which armatures 44 and 46 are activated. Gas is transferred from reservoir 16 through pipe 18, through passage 94, through port 96, around armature 44, through port 54 and into the gas storage device 66 through port 64, around armature 46, through port 42, through passage 104 and through pipe 22 to tube 10. After this predetermined time has expired, solenoids 40 and 42 are deenergized enabling the gas stored in gas retaining device 66 to be retained. In the event this amount of gas is insufficient to restore the gas pressure in laser tube 10 to the proper level as sensed by the voltage detector 30, the voltage detector 30 will again send the appropriate pressure related signal through line 32 to the voltage comparator 31 to reinitiate the same cycle and which cycle is repeated until an adequate pressure is reestablished in laser tube 10 thus signifying an adequate volume of gas within laser tube 10.

Figure 3:
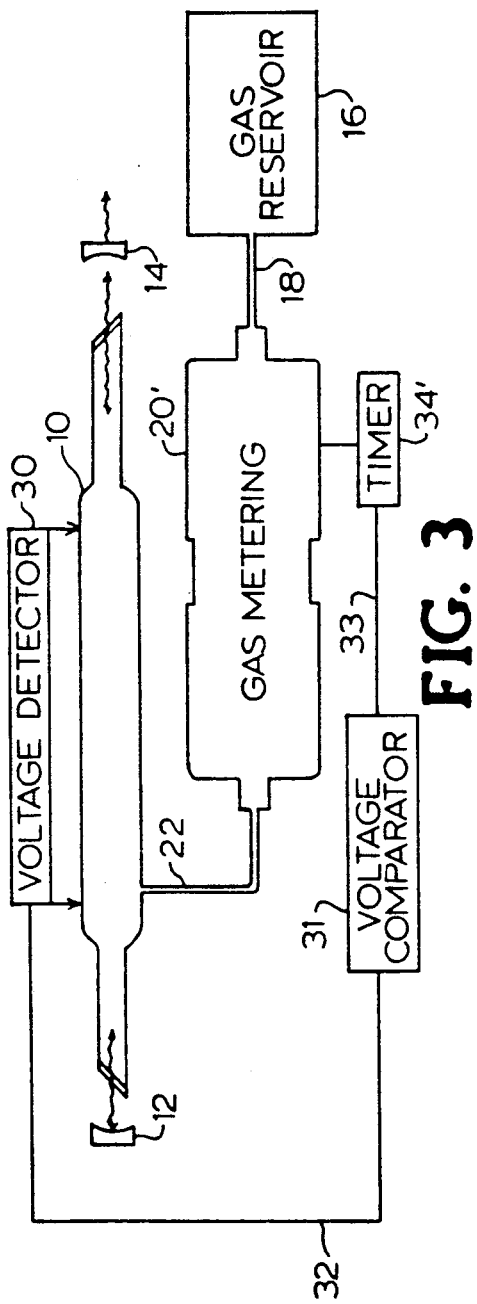
FIG. 3 is a schematic drawing of a gas replenishment system for a gas laser according to a second embodiment of the invention.

In the second embodiment, schematically illustrated in FIG. 3, an alternative gas metering device 20' replaces the previously described gas metering device 20 of FIGS. 1 and 2 and the timer 34' replaces the previously described timer 34. Otherwise, those parts which appear in both FIGS. 1 and 3 are given the same numerical references and the further description will primarily refer to the alternative gas metering device 20' shown in FIG. 4.

Figure 4:
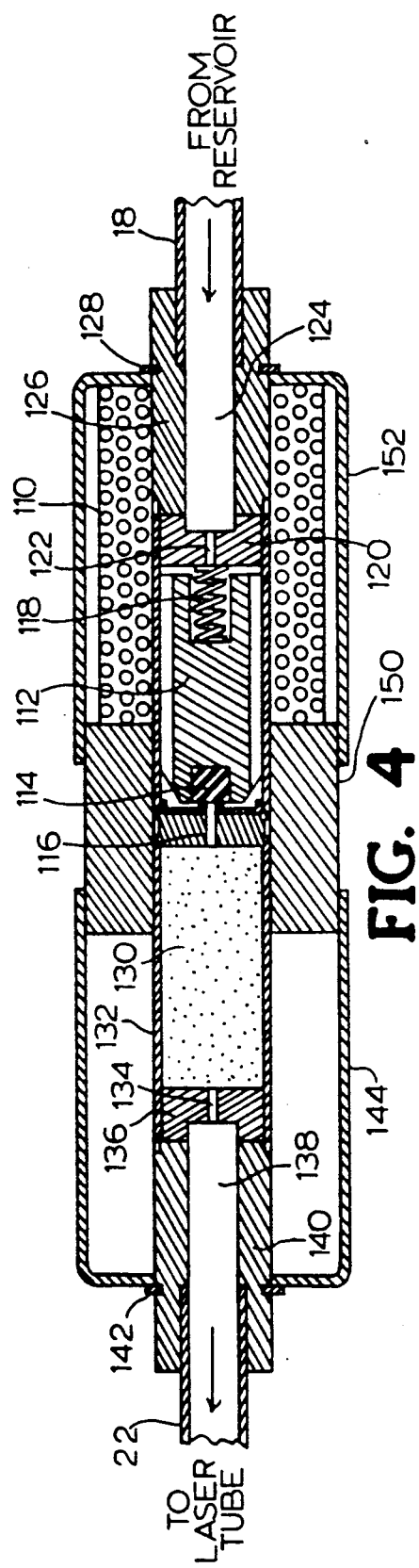
FIG. 4 is a sectional and enlarged view through a gas metering device utilizing a single solenoid according to a second embodiment of the invention.

In FIG. 4, the single solenoid 110 includes an armature 112 having a valve closure block 114 which serves to open and close the port 116 and is loaded by a spring 118 which bears against a spring loading block 120 forming port 122 connected to passage 124 in block 126 held by C-ring 128. A cylinder 130 of gas retaining material extends between port 116 and port 134 formed in block 136. A housing 132 surrounds block 130 and port 134 connects to passage 138 formed in block 140 held by C-ring 142. An outer cylindrical cover 144 surrounds block 140 and an intermediate annular block 150 connects cylindrical covers 144 and 152.

In operation according to the second embodiment, the voltage detector 30 sends a signal representative of the pressure in laser tube 10. Upon a drop in pressure below normal, voltage comparator 31 develops and sends a signal to the timer 34' which energizes solenoid 110 for some predetermined time corresponding to some predetermined volume of gas to be admitted to tube 10. Upon being energized, armature 112 is opened which opens port 116 to the flow of gas through pipe 18, through passage 124, through port 122, around armature 112, through port 116 and into the gas retaining material provided by cylinder 130. After some predetermined time corresponding to a desired amount of gas to be admitted, the gas retaining device 130 is filled, solenoid 110 is deenergized and whereupon gas is withdrawn from the gas retaining device 130 through port 134 into passage 140 and through discharge line 22 to the gas laser tube 10 to restore the pressure. In the event such amount of gas is insufficient to restore the appropriate pressure, voltage detector 30 will cause the cycle to be repeated.

In both embodiments, the housing structure effectively encloses the metering device and connects the inlet pipe to the reservoir and the outlet pipe to the laser tube. The solenoid controlled valves in both embodiments are also operative to control the passage of gas through the metering device.

I claim:

1. A gas replenishment system for a gas laser having a gas filled tube defining a laser discharge path, said gas replenishment system comprising:
    (a) a gas reservoir containing a supply of replacement gas under a pressure which exceeds the pressure of the gas in the laser tube;
    (b) a gas retaining housing structure having one end connected through an inlet pipe to said reservoir and the opposite end connected through a discharge pipe to the laser tube such that increments of replenishment gas can be passed from said reservoir through said housing structure and to said laser tube;
    (c) gas metering means located within said housing structure between said inlet and discharge pipes, comprising:
        (i) a body of gas entrapping material formed of sintered stainless steel;
        (ii) an internal gas containing housing surrounding said gas entrapping material and formed with entrance and exit ports; and
        (iii) electrically controlled valve means operative in association with said ports to control the passage of gas through said gas entrapping material;
    (d) voltage detector means for detecting the operating voltage of the laser tube and developing a first signal representative of the tube pressure corresponding to the detected voltage;
    (e) voltage comparator means connected to receive said first signal, compare the voltage corresponding thereto to a voltage corresponding to the desired level of pressure within said tube and in the event of said detected voltage indicating a pressure below said desired level to develop a second signal;
    (f) timing means connected to receive said second signal and in response thereto being operative to develop a third signal for some predetermined time and after such time to terminate such third signal; and
    (g) electrical actuating means operative to receive said third signal and utilizing said third signal to actuate said valve means for said predetermined time in a manner enabling a quantity of said replenishment gas under the influence of the difference in pressure in said reservoir and tube to flow from said reservoir into said body of gas retaining material, be temporarily stored therein and then flow therefrom into said tube.

2. A gas replenishment system as claimed in claim 1 wherein said electrically controlled valve means comprises a pair of solenoid controlled spring loaded valve means operative when not energized to close both said ports and when energized to open both said ports.

3. A gas replenishment system as claimed in claim 1 wherein said electrically controlled valve means comprises a single solenoid controlled spring loaded valve means operative when not energized to close said entrance port and when energized to open said entrance port.

4. A gas replenishment system for a gas laser having a gas filled tube defining a laser discharge path, said gas replenishment system comprising:
   (a) a gas reservoir containing a supply of replacement gas under a pressure which exceeds the pressure of the gas in the laser tube;
   (b) a body of gas entrapping material formed of sintered stainless steel enclosed in a housing having an inlet passage connected to said reservoir and an outlet passage connected to the laser tube;
   (c) electrically controlled valve means located and operative to control the passage of gas between said inlet and outlet passages and through said body of gas material;
   (d) means for developing a first signal corresponding to the tube pressure;
   (e) means for receiving said first signal and in the event of said pressure being low developing a second signal; and
   (f) means for receiving said second signal and for some predetermined time dependent upon receiving said second signal developing a third signal and transmitting said third signal to said electrically controlled valve means enabling gas to flow for said predetermined time from said reservoir to the laser tube to restore the pressure therein.

5. A gas replenishment system as claimed in claim 4 wherein said electrically controlled valve means comprises a pair of solenoid controlled spring loaded valve means operative when not energized to close both said passages and when energized to open both said passages.

6. A gas replenishment system as claimed in claim 4 wherein said electrically controlled valve means comprises a single solenoid controlled spring loaded valve means operative when not energized to close said inlet passage and when energized to open said inlet passage.

7. A gas replenishment system for a gas laser having a gas filled tube defining a laser discharge path, said gas replenishment system comprising:
   (a) a gas reservoir containing a supply of replacement gas under a pressure which exceeds the pressure of the gas in the laser tube;
   (b) a gas retaining tubular housing structure having one end connected through an inlet pipe to said reservoir and the opposite end connected through a discharge pipe to the laser tube such that increments of replenishment gas can be passed from said reservoir through said housing structure and to said laser tube;
   (c) gas metering means located within said tubular housing structure between said inlet and discharge pipes, comprising:
      (i) a body of gas entrapping material;
      (ii) a gas containing housing surrounding said gas entrapping material and formed with entrance and exit ports;
      (iii) electrically controlled valve means operative in association with said ports to control the passage of gas through said gas entrapping material;
      (iv) said body of gas entrapping material and said electrically controlled valve means being axially spaced within said tubular housing structure;
   (d) voltage detector means for detecting the operating voltage of the laser tube and developing a first signal representative of the tube pressure corresponding to the detected voltage;
   (e) voltage comparator means connected to receive said first signal, compare the voltage corresponding thereto to a voltage corresponding to the desired level of pressure within said tube and in the event of said detected voltage indicating a pressure below said desired level to develop a second signal; and
   (f) electrical actuating means operative to receive said second signal and in response thereto to actuate said valve means for some predetermined time in a manner enabling a quantity of said replenishment time in a manner enabling a quantity of said replenishment gas under the influence of the difference in pressure in said reservoir and tube to flow from said reservoir into said body of gas retaining material, be temporarily stored therein and then flow therefrom into said tube.

8. A gas replenishment system for a gas laser having a gas filled tube defining a laser discharge path, said gas replenishment system comprising:
   (a) a gas reservoir containing a supply of replacement gas under a pressure which exceeds the pressure of the gas in the laser tube;
   (b) a body of gas entrapping material enclosed in a housing having an inlet passage connected to said reservoir and an outlet passage connected to the laser tube;
   (c) solenoid valve means located and operative to control the passage of gas from said gas reservoir through said body of gas entrapping material;
   (d) means for developing a first signal corresponding to the pressure in the gas filled tube;
   (e) means for receiving and evaluating said first signal and for generating a second signal if said first signal indicates a said pressure below a selected value; and
   (f) means for receiving said second signal and for some predetermined time dependent upon receiving said second signal developing a third signal operative to energize said solenoid valve means enabling a quantity of said replenishment gas under the influence of the difference in pressure in said reservoir and the tube to flow from said reservoir into said body of gas retaining material, be temporarily stored herein and then flow therefrom into said tube.

* * * * *